United States Patent [19]

Ladish

[11] Patent Number: 4,544,690

[45] Date of Patent: Oct. 1, 1985

[54] AQUEOUS RUBBERIZED COAL TAR EMULSION

[75] Inventor: Douglas J. Ladish, Dover, Del.

[73] Assignee: Reichhold Chemicals, Incorporated, White Plains, N.Y.

[21] Appl. No.: 517,706

[22] Filed: Jul. 27, 1983

[51] Int. Cl.$^4$ .................. C08L 25/10; C08L 95/00
[52] U.S. Cl. .................................. 524/60; 404/17; 404/31; 524/66
[58] Field of Search .................. 524/60, 66; 404/31

[56] References Cited

U.S. PATENT DOCUMENTS

| | | | |
|---|---|---|---|
| 2,670,332 | 2/1954 | McCoy et al. | 524/66 |
| 2,972,588 | 2/1961 | Cohen | 524/66 |
| 3,835,117 | 9/1974 | Walaschek | 524/60 |
| 3,897,380 | 7/1975 | Walaschek | 524/60 |
| 4,045,395 | 8/1977 | Ruby | 524/60 |

OTHER PUBLICATIONS

Boundy et al., "Styrene, Its Polymers, Copolymers and Derivatives", ACS Monograph, 1962, p. 285.

*Primary Examiner*—Allan M. Lieberman

[57] ABSTRACT

An aqueous rubberized coal tar emulsion composition especially suitable for coating and sealing bituminous substrates containing asphalt such as asphalt pavement and the like, the coal tar emulsion composition comprising a major portion of commercial coal tar emulsion and water admixed with a small amount of a carboxylated butadiene/styrene/acid copolymer latex having a particular particle size. The emulsion composition may additionally include a fine aggregate filler material such as sand. The coal tar emulsion composition according to the invention is of a thixotropic nature and has the ability to maintain the fine aggregate when added and mixed therein in a homogeneous-like suspension. The emulsion composition when spread on an asphalt surface exhibits a high degree of spreadability and provides a sealing coating that has a long life.

34 Claims, No Drawings

AQUEOUS RUBBERIZED COAL TAR EMULSION

BACKGROUND OF THE INVENTION

This invention relates to an improved aqueous acid copolymer latex reinforced coal tar emulsion composition, and more particularly to rubberized coal tar emulsion containing butadiene/styrene/acid copolymer latices especially useful for applying a tough durable sealing coat to asphalt pavement surfaces.

Aqueous coal tar emulsions have been known and used in the art as protective coatings for many years. The most common form of aqueous tar emulsions used are coal tar in an aqueous medium with an emulsifying or dispersing agent such as an organic soap or detergent and/or an inorganic colloid such as a particulate clay like bentonite. In this type of prior art treatment the materials are reduced in tar particle size to the discontinuous or emulsified phase to produce tar particles of an average range size of from about 3 to 10 microns. It is known that when an ordinary emulsified coal tar coating dries upon an asphalt substrate, the dried coating exhibits certain disadvantages such as being attacked by gasoline, jet fuel, and the like.

It has been found that solvent resistance and elasticity of coal tar emulsions might be improved by the incorporation of a synthetic latex into the emulsion. Such polymer containing coal tar emulsions have in most instances been unsatisfactory apparently for the reason that the ultimate composition comprised an emulsion of different types of particles, namely, coal tar and polymer, and as the composition dried, a loose junction between latex and coal tar resulted which was readily broken down upon ordinary weather conditions, temperature, light, and other chemical and physical film-attacking agents. Moreover, in some instances the resultant protective coating had a tendency to re-emulsify when it was subjected to detergent and water. This difference in particle size was taken into consideration in the U.S. Patents to Walaschek Nos. 3,897,380 and 3,835,117 in which the acrylonitrile/butadiene copolymer was maintained at an average particle size of between 400 and 1000 Ångstroms.

U.S. Patent to Kemp et al No. 3,027,342 discloses a rubberized coal tar emulsion which avoids the use of an emulsifying agent. A dry copolymer of acrylonitrile and butadiene is incorporated into a coal tar composition and is emulsified in an aqueous medium without the addition of an emulsifying agent by vigorous mechanical mixing in a colloid mill or the like.

The patent to Kemp U.S. Pat. No. 3,296,165 discloses a coal tar emulsion composition comprising an emulsion coating including an emulsified coal tar/clay mixture and a butyl rubber latex. That composition further includes an aluminum powder additive and is especially suited for roofing applications. The patent to Chang U.S. Pat. No. 3,497,371 discloses a coal tar emulsion including certain filler materials and a synthetic rubber latex. The emulsion composition further includes certain water-insoluble organic amines for the purpose of imparting superior water resistance to films cast of those coal tar emulsions.

SUMMARY OF THE INVENTION

The present invention provides for an improved rubberized coal tar emulsion composition which is capable of maintaining a homogeneous emulsion in which the tar and latex particles are held together to assure a lasting and superior coating especially suitable for use as a sealer for asphalt pavement surfaces, roofs, and the like. The coating of this invention has a high degree of spreadability because of its unique flow properties produced by the presence of acid moieties in the copolymer latex mixed with particles of a coal tar emulsion.

The invention further provides a rubberized coal tar emulsion in which fine aggregate such as sand can be readily admixed in the rubberized coal tar emulsion in the field where it is to be used and when so mixed has an excellent storage life, being capable of being stored up to about a week without the likelihood of a high degree of fallout. Also, the rubberized coal tar emulsion provides for ease of spreadability without fallout.

One of the principal advantages of the coal tar emulsion composition of this invention is the superior bonding qualities exhibited when compared to similar known prior art compositions. Moreover, the invention provides novel thixotropic rubberized coal tar emulsion compositions which retain their thixotropic nature when cast in an overlay film and have the ability to maintain a heavy load of aggregate filler material, such as sand, in a homogeneous-like suspension even when applied in relatively thick films to an asphalt substrate.

In addition, the rubberized coal tar compositions of this invention provide a high degree of sealing when coated on asphalt substrates such as pavements, characterized by a long wear life, toughness, excellent resistance to solvents and weathering, improved ease of spreadability, and ease of application even where thick coatings are applied. Thus, the rubberized coal tar compositions are also excellent for sealing cracks and the like.

DESCRIPTION OF PREFERRED EMBODIMENTS

The new and improved aqueous rubberized coal tar emulsion compositions of this invention for coating or sealing asphalt surfaces comprise a major portion of a commercial coal tar emulsion and water, a minor portion of an aqueous dispersion of an acid copolymer prepared by emulsion polymerization in aqueous medium of a monomeric material containing at least 50 percent by weight of a conjugated butadiene, up to about 5.0 percent by weight of at least one polymerizable olefinically unsaturated carboxylic acid and mixtures thereof, and styrene with a copolymer latex having an average particle size of from about 600 to 1200 Å to blend with the particle size of the coal tar particles.

In addition to carboxylated butadiene styrene polymers, it has been found that carboxylated acrylic, carboxylated vinyl acetate-acrylic, and carboxylated vinyl acetate polymers are other acid copolymers that provide good coating characteristics.

The coating compositions according to the invention may further include appropriate aggregate fillers such as sand and the like. It is most preferred in the case where sand is employed to provide a relatively coarse sand such as a sand blasting grade, e.g., sand designated as No. 3 Q-Rock by Pennsylvania Glass Sand Company of Pittsburgh, Pa., which has been found to provide excellent filler results. The preferred coarse aggregate filler materials most preferably are those whose particle size is such that all parts pass through a U.S. Standard No. 20 square mesh screen and wherein 50 percent by weight of the sand passes through a U.S. Standard No. 30 mesh square screen, with no more than 2 percent by weight passing through a U.S. Standard No. 100 square mesh screen.

While sand is the most common aggregate used, any aggregate that is compatible in forming a coal tar emulsion may be used to make the coal tar emulsion, such as crushed boiler slag commonly known as "Black Beauty", and the like.

The carboxylated butadiene/styrene copolymer latex that is mixed with coal tar emulsion of this invention can be formed in a manner disclosed in U.S. Patents to Finnegan and Miller Nos. 2,961,348 and 3,156,581; and in the U.S. Patent to Miller No. 3,256,234 and Reissue Pat. No. RE 27,269, the contents of which patents are made a part of this disclosure by way of reference.

Also, the acid copolymer of butadiene and styrene may contain at least one of either mono- or di-carboxylic acid groups or may contain mixtures thereof. Exemplary of the preferred monocarboxylic acid moieties of the carboxylic acid copolymer are methacrylic acid, acrylic acid, crotonic acid, and the like.

The monocarboxylic acid containing copolymer useful in this invention can be prepared conveniently by the polymerization of monomeric materials, in the proportions set forth herein, comprising at least one conjugated diene, low molecular hydrocarbon having from 4 to about 10 carbon atoms, such as butadiene, isoprene and a conjugated chlorodiene having 4 to about 10 carbon atoms such as chloroprene and the like; a vinyl compound, such as acrylonitrile, styrene, or esters of acrylic acid or methacrylic acid formed from aliphatic alcohols having from 1 to about 10 carbon atoms, and with an ethylenically unsaturated monocarboxylic acid. Exemplary of such aliphatic alcohols are methyl, ethyl, butyl, 2-ethylhexyl, octyl and decyl alcohols and the like. Exemplary of such conjugated dienes suitable for use in any of the foregoing described methods involving carboxylcontaining diene polymers include the butadiene-1,3 hydrocarbons such as butadiene-1,3 itself; 2-methyl butadiene-1,3(isoprene); 2,3-dimethyl butadiene-1,3; 2-neopentyl butadiene-1,3; and other hydrocarbon homologs of butadiene-1,3 and in addition the substituted dienes such as 2-chlorobutadiene-1,3; 2,5-dimethylhexadiene-3,4; the straight chain conjugated pentadienes such as piperylene; the straight and branch-chain conjugated hexadienes and others. In general, dienes containing more than 10 carbon atoms polymerize very slowly, if at all, in present polymerization systems and it is therefore preferred to employ a diene having 10 carbon atoms or less, while dienes having 4 to 6 carbon atoms have particularly advantageous reaction rates and polymerization characteristics and are much preferred. Exemplary olefinically unsaturated monocarboxylic acids include crotonic acid, alpha-chlorocrotonic acid, isocrotonic acid or cis-2-butenoic acid, hydrosorbic acid, cinnamic acid, m-chlorocinnamic acid, p-chlorocinnamic acid, acrylic acid, alpha-chloroacrylic acid, methacrylic acid, ethacrylic acid, vinyl thiophenic acid, alpha-furyl acrylic acid, vinyl furoic acid, p-vinylbenzoic acid, vinyl-napthoic acid and other polymerizable monoolefinically unsaturated monocarboxylic acids; alpha-isopropenyl acrylic acid, alpha-styryl acrylic acid (2-carboxy-4-phenyl-1,3-butadiene), sorbic acid, alpha-methyl sorbic acid, alpha-ethyl sorbic acid, alpha-chlorosorbic acid, alpha-bromosorbic acid, beta-chlorosorbic acid, alpha-, beta-, or gamma-epsilon-dimethyl sorbic acid, 2,4-heptadienoic acid, 2,4-hexadienoic acid, 2,4-pentadienoic acid, alpha-vinyl cinnamic acid, alpha- and beta-vinyl acrylic acids, and other polymerizable poly-olefinically unsaturated monocarobxylic acids.

It is to be understood that the polymerization heretofore described is conducted under such conditions that the ethylenically unsaturated monocarboxylic acid is introduced into the polymer chain, and not under conditions such that the acid undergoes substantial homopolymerization. If the polymerization reaction is allowed to proceed to approximately 100 percent completion, then the ratios of the monomers charged represents the ratio of the polymerized constituents in the polymer chain. By acidic copolymer is meant a copolymer containing carboxyl groups in the polymer chain.

The copolymerization of unsaturated monocarboxylic acids of low molecular weight with non-acidic conjugated diene-vinyl monomers is advantageously effected by emulsification of the monomers in an acid aqueous medium using emulsifiers stable therein. Suitable emulsifiers include the ethers and esters of polyglycols with aliphatic acids having from 10 to 20 carbon atoms; alkyl sulfonates or sulfates and alkylaryl sulfonates where the alkyl group contains from 10 to 20 carbon atoms, alkylaryl polyether sulfates or sulfated monoglycerides and similar emulsifiers that will occur to those skilled in the art. A particularly effective type of emulsifier has been found to be the amine salts of alkylaryl sulfonates. The polymerization may also include small amounts of stabilizers known to the art. The polymerization reaction may be promoted by the addition of free-radical yielding catalysts such as the alkali persulfates, percarbonates, perborates and the like, organic peracids, such as benzoyl peroxide, acetyl peroxide, and the like, alkyl peroxides such as di-t-butyl peroxide and organic hydroperoxides, such as diisopropylbenzene hydroperoxide. The polymerization mass may also contain small amounts of the sulfhydryl-group-containing compounds termed "modifiers" in the synthetic rubber industry, such as alkylmercaptans containing from about 10 to 22 carbon atoms, e.g., n-dodecyl mercaptan, the commercially available mixed tertiary mercaptans containing from 12 to 16 carbon atoms, thiophenol, alpha- or beta-thionaphthol and the like. The polymerization can be effected within a wide range of temperatures; for example within the range from about 5° C. to about 70° C. The above method conveniently results in the formation of polymer in the form of a latex or suspension of small drops or globules.

The polymerization described above is advantageously effected using an anionic or non-ionic emulsifier in the event that it is desired to neutralize or make alkaline, such as to a pH of about 7 or above, such as up to about 11, the resulting emulsion with a monovalent base without coagulation. Such neutralization results in salt formation by reaction or condensation of the cation of the monovalent base with the carboxylic acid groups of the polymer. Since some latices tend to thicken or swell, probably due to water imbibition, at high pH values, it is frequently desirable to add only enough base to raise the pH of the latex to a value in the lower portion of the alkaline range generally below about 9. The neutralization may be effected with a volatile or thermally unstable monovalent base, such as ammonia, ethylamine, ethanolamine, morpholine, polymethylbenzyl ammonium hydroxide and the like or a fixed alkali such as NaOH and the like so that, during the drying or curing operation following deposition of the acidic copolymer, the cations of the monovalent base combined with the carboxylic acid groups of the acidic polymer are substantially completely replaced with the polyvalent cations of the cation producing compound incorporated in the aqueous emulsion.

Exemplary of the preferred moieties of the dicarboxylic acid are fumaric acid, itaconic acid, and the like. The polycarboxylic acid-containing copolymers are preferably ter- or multi-polymers formed by the acid copolymerization of monomeric material containing a major portion of one or more aliphatic conjugated dienes, preferably 1,3-conjugated dienes having 4 to 10 carbon atoms, such as butadiene-1,3, and one or more non-carboxylic copolymerizable monoolefinic monomers, and a minor portion of at least one copolymerizable olefinically unsaturated polycarboxylic acid.

In polymerizations where the acid polymer is directly produced, suitable acids are characterized by possessing one or more olefinic carbon-to-carbon double bonds and two or more carboxyl groups, in which at least one of the olefinic carbon-to-carbon double bonds is activated, as is understood in the polymerization art, to render the acid copolymerizable with the butadiene and the non-carboxylic monoolefinic monomer.

It is advantageous to utilize one or more olefinically unsaturated polycarboxylic acids containing an activated olefinic double bond which readily functions in an addition polymerization reaction because it is present in the monomer molecule either in the alpha-beta position with respect to a strongly polar or functional group, such as carboxyl or others which are well known as activating groups, or because it is adjacent to a terminal methylene group, $CH_2=C<$.

For example, such olefinically unsaturated polycarboxylic acids include fumaric, maleic, citraconic, mesaconic, itaconic, aconitic, ethyl maleic acid, methyl itaconic, muconic, hydromuconic, glutaconic, 3-carboxy-pentadiene-(2,4)-oic-1, beta-(p-carboxyphenyl) acrylic, 2,4-pentadiendioic-1,3 acid, the dimer and trimer of methacrylic acid and other monoolefinic and polyolefinic polycarboxylic acids. The utilization of these copolymerizable polybasic acids or their anhydrides which are readily hydrolyzed in the acidic polymerization provides a means for direct introduction of the polycarboxylic acid groups into the polymer chain.

Other methods for formation or introduction of the polycarboxylic acid groups to obtain the desired polymer may be utilized. One such method is the copolymerization with the aliphatic conjugated diene, of copolymerizable partial or full esters of the olefinically unsaturated polycarboxylic acids, followed by hydrolysis of a part or all of the ester groups to obtain the polycarboxylic acid groups in the polymer chain. This may be accomplished, for example, by hydrolysis in alkaline medium under suitable temperature and pressure conditions. Acidification of the resulting salt produces the free acid.

U.S. Patent to Brown No. 2,710,292 discloses a hydrolysis method of forming carboxyl-containing diene polymers.

One of the preferred acid copolymer latices mixed with the coal tar emulsion contains butadiene and styrene, acrylic acid and fumaric acid. It has been found that butadiene in the range of about 50 to about 90 percent by weight; styrene in the range of 49 to 9 percent by weight; and ethylenically unsaturated carboxylic acid from about 1 to about 20 percent by weight of the acid copolymer provide excellent results.

Also, an emulsifier compatible with the system can be used when the acid copolymer latex is mixed in the coal tar emulsion. An emulsifier such as sodium lauryl sulfate and the like has been found to produce very good results.

In addition, the acid copolymer latex can be adjusted to a pH of about 6 to about 6.5 with the addition of sufficient bactericide to preserve the acid copolymer emulsion under extended storage conditions.

The conventional coal tar emulsion can be prepared from any standard coal tar that meets Federal specifications, such as Government Specification R-P-355d dated Apr. 16, 1965. The proportion of coal tar by weight to water can vary between from about 40 to about 60 percent coal tar.

The aqueous rubberized coal tar emulsion coating composition consists essentially of water, a conventional coal tar emulsion and from about 1 to about 20 percent by volume of an acid copolymer emulsion based on the volume of the coal tar emulsion. The acid copolymer contains at least about 50 percent by weight of butadiene, styrene, and up to about 20 percent by weight of at least one polymerizable ethylenically unsaturated carboxylic acid or mixtures thereof, with all of the weight of the moieties of the acid copolymer based on the weight of the acid copolymer.

The butadiene/styrene/acid copolymer latices useful in compositions of the invention have an extraordinarily small partical size, particularly an average latex particle size between 400 and 2000 Ångstroms may be used in general, however, applicant preferred particle size use of from about 600 to about 1200 Ångstroms.

The thixotropic nature of the composition of this invention is long-lasting, and renders pavement coating compositions according to the invention reasonably storage stable. It has been noted that sand and other aggregate filler materials in compositions according to the invention do not settle out when applied for example to an asphalt substrate even when present in extraordinarily high amounts. Nor does the aggregate filler fall to the bottom of a blending tank when a composition is made after initial thorough mixing of components, even when the tank is allowed to stand for a considerable period of time, such as a week. It has also been found that rubberized compositions of this invention can be applied in coating up to several times thicker, usually 2 to 10 times thicker, than would ordinarily be expected from most conventional asphalt coating compositions because of the high thixotropic nature of the coal tar emulsion containing acid copolymer.

In the formation of rubberized coal tar emulsion the following materials may be mixed in order, making sure each component is completely dispersed before adding the next one. Temperature of the materials should be between 60° and 80° F. The suitable proportions for a mix are as follows:

|  | Lab batch, grams | Site batch equivalent |
| --- | --- | --- |
| Coal tar emulsion | 327 | 100 gal. |
| Water | 275 | 100 gal. |
| Sand | 528 | 1600 lbs. |
| Additive carboxylated latex | 22 to 28 | 8 to 10 gal. |

Where a three-blade mixing shaft is used, mix the batch for 7.5 minutes after addition of the latex additive. The mixer speed should be adjusted so that the surface is moving and only a light vortex is formed. The mixer should be positioned so that the mixer shaft is at approximately a 15° angle from the vertical. Also, part of the carboxylated latex can be added before the sand is introduced with the balance of the latex being added after all the sand has been included.

Where sand is replaced by other aggregates, the same mixing procedure applies, except that the carboxylated latex additive may vary. In the case of boiler slag, the carboxylated latex would be reduced in the order of from about 30 to about 50 percent by weight of that used where sand is the aggregate.

The invention is further described by the following examples.

EXAMPLE I

An acid copolymer latex was made from an acid copolymer formed by the emulsion polymerization of butadiene, styrene, methacrylic acid, fumaric acid in the following proportions: butadiene 55%, styrene 42%, methacrylic acid 2%, and fumaric acid 1%, all based on the total weight of the acid copolymer.

Sodium lauryl sulfate was used as the primary emulsifier, and the pH range was maintained between 6 and 6.5. The particle size was found to be in the range of 600 to 1200 Å.

EXAMPLE II

The acid copolymer of Example I in emulsion form was used to form the rubberized coal tar emulsion coating composition of this invention by mixing a coal tar emulsion, water, and the acid copolymer as shown in the following Table I.

TABLE I

| Material | Amount gallons | Amount pounds | Total solids, % | Dry weight | Solid parts per 100 parts coal tar emulsion solids |
|---|---|---|---|---|---|
| Coal tar emulsion | 100 | 995 | 50 | 497.5 | 100 |
| Water | 100 | 834 | — | — | |
| Acid copolymer latex | 10 | 83 | 40 | 33.2 | 6.7 |
| Sand* | 80 | 1600 | 100 | 1600 | 321.6 |
| | 290 | 3512 | (60.7%) | 2130.7 | 428.3 |

*Sand is a coarse silica sand sold by Pennsylvania Glass Sand Co., size #2, Q-Rok. Particle size is such that most passes 20 mesh screen but is retained by a 30 mesh screen (Standard U.S. Sieve).

The following Table II has the same formulation of ingredients as in Table I except that no sand is present in the resulting rubberized coal tar emulsion.

TABLE II

| Without sand | Amount gallons | Amount pounds | Total solids, % | Dry weight | Solid parts per 100 parts coal tar emulsion solids |
|---|---|---|---|---|---|
| Coal tar emulsion | 100 | 995 | 50 | 497.5 | 100 |
| Water | 100 | 834 | — | — | |
| Acid copolymer latex | 4 | 33.4 | 40 | 13.4 | 2.7 |
| | 204 | 1862.4 | (27.4%) | 510.9 | 102.7 |

It was noted that the inclusion of the acid copolymer latex in the coal tar emulsion provided in the rubberized coal tar emulsion a pseudoplastic rheology and contributed to an improved thixotropic nature of the emulsion and the high degree of spreadability and aggregate suspension.

It was also found that the coating compositions of both Table I and II when applied to an asphalt substrate such as an asphalt pavement, roof or the like, provided an excellent coat that exhibited a high degree of spreadability and adhesion to the surface being coated.

EXAMPLE III

This example illustrates the retaining of the viscosity after mixing by the addition of an acid copolymer latex as shown below.

| | | Site batch equivalent |
|---|---|---|
| Coal tar emulsion | 2267.96 grams | 100 gal. |
| Water | 1905.09 grams | 100 gal. |
| 00 Sand | 1814.37 grams | 800 lbs. |
| Carboxylated latex of Example I | 132 grams | 7 gal. |

The viscosity was taken after various lengths of mixing time:

| Brookfield Viscosity (20 rpm), cps | |
|---|---|
| after 2 minutes mixing | 3900 |
| after 15 minutes mixing | 3900 |
| after 30 minutes mixing | 3740. |

These data show that the rubberized coal tar emulsion produces a viscosity that has little change with mix time and thus maintains the emulsion in a spreadable form providing economical use and ease of application.

EXAMPLE IV

This example illustrates the greater viscosity by the inclusion of twice as much sand as in Example III.

| | | Site batch equivalent |
|---|---|---|
| Coal tar emulsion | 2267.96 grams | 100 gal. |
| Water | 1905.09 grams | 100 gal. |
| 00 Sand | 3628.74 grams | 1600 lbs. |
| Carboxylated latex of Example I | 132 grams | 7 gal. |

It was noted that the inclusion of twice as much sand over that in Example III increased the viscosity after 15 minutes of mixing to 4300 cps.

EXAMPLE V

This example illustrates the effect of different carboxylic acids on the resultant viscosity modification.

| | | Site batch equivalent |
|---|---|---|
| Coal tar emulsion | 298 grams | 100 gal. |
| Water | 250 grams | 100 gal. |
| #2 Sand | 240 grams | 800 lbs. |
| Carboxylated latex* | 25 grams | 7 gal. |

*Carboxylated latex of Example I contained the following acid moieties:

| | A | B | C |
|---|---|---|---|
| Methacrylic acid | 2.5 | 2 | 2 |
| Fumaric acid | — | 1 | — |
| Itaconic acid | — | — | 1 |
| Viscosity after | 1700 | 3100 | 3750 |

```
15 min. mixing
(Brookfield at 20
RPM) cps
```

It was noted that the use of the preferred embodiment of methacrylic acid and itaconic acid in the carboxylated latex provided a very high and a desirable viscosity.

Various modifications and alternatives may be utilized in the practice of the invention, which are encompassed within its scope, including those which suggest themselves to those skilled in the are, and are to be regarded as within the scope of the claims hereafter appended.

What is claimed is:

1. An aqueous rubberized coal tar emulsion coating composition for application to a paved asphalt surface and the like consisting essentially of a standard coal tar emulsion containing about 40 to about 60 percent water based on the volume of the coal tar emulsion and from about 1 to about 20 percent by volume of an acid copolymer latex emulsion based on the volume of the coal tar emulsion, wherein said copolymer contains at least about 50 percent by weight of a combination of butadiene and styrene, and up to about 20 percent by weight of at least one polymerizable ethylenically unsaturated carboxylic acid or mixtures thereof to form the acid copolymer latex, said acid copolymer latex emulsion having an average latex particle size of from about 400 to about 2000 Ångstroms, all moieties of the acid copolymer latex emulsion based on the weight of the copolymer, whereby said composition is characterized by a thixotropic nature.

2. The coating composition of claim 1 in which the acid copolymer latex contains from about 50 to about 90 percent by weight butadiene, from about 49 to about 9 percent by weight styrene, and from about 1 to about 5 percent by weight of an olefinic unsaturated carboxylic acid, and mixtures thereof.

3. The coating composition of claim 1 in which the latex copolymer emulsion ranges from about 2 to about 20 percent by volume of the coal tar emulsion content.

4. The coating composition of claim 1 in which the average particle size of the acid copolymer latex emulsion is from about 600 to about 1200 Ångstroms.

5. The coating composition of claim 1 further containing sand having a particle size range such that all sand passes through a U.S. Standard No. 20 mesh square screen and wherein 50 percent by weight of the sand passes through a U.S. Standard No. 30 mesh square screen, with no more than 2 weight percent passing through a U.S. Standard No. 100 mesh square screen.

6. The composition of claim 1 in which said polymerizable ethylenically unsaturated carboxylic acid is a monocarboxylic acid or mixtures thereof.

7. The composition of claim 6 in which the ethylenically unsaturated monocarboxylic acid is methacrylic acid.

8. The composition of claim 6 in which the ethylenically unsaturated monocarboxylic acid is acrylic acid.

9. The composition of claim 6 in which the ethylenically unsaturated monocarboxylic acid is crotonic acid.

10. The composition of claim 6 in which the ethylenically unsaturated monocarboxylic acid is a mixture of methacrylic acid and acrylic acid.

11. The composition of claim 1 in which said polymerizable ethylenically unsaturated carboxylic acid is a polycarboxylic acid or mixtures thereof.

12. The composition of claim 11 in which the ethylenically unsaturated polycarboxylic acid is fumaric acid.

13. The composition of claim 11 in which the ethylenically unsaturated polycarboxylic acid is itaconic acid.

14. The composition of claim 11 in which the ethylenically unsaturated polycarboxylic acid is a mixture of fumaric acid and itaconic acid.

15. The composition of claim 1 in which the ethylenically unsaturated carboxylic acid is a mixture of monocarboxylic and polycarboxylic ethylenically unsaturated acids.

16. The composition of claim 15 in which the ethylenically unsaturated carboxylic acid is a mixture of methacrylic acid and fumaric acid.

17. A thixotropic rubberized coal-tar-containing composition for coating asphalt pavements and the like consisting essentially of a mixture of a standard coal tar emulsion containing about 40 to about 60 percent water based on the volume of the coal tar emulsion and from about 1 to about 20 percent by volume of an acid copolymer latex emulsion based on the volume of the coal tar emulsion, wherein said copolymer contains at least 50 percent by weight of a combination of butadiene and styrene, and up to about 20 percent by weight of at least one polymerizable ethylenically unsaturated monomer containing at least one carboxylic acid group or mixtures thereof to form the said copolymer latex, said acid copolymer latex emulsion having an average latex particle size of from about 400 to about 2000 Ångstroms, all moieties of the acid copolymer based on the weight of the copolymer, and sand being present in the amount of between 0.5 and about 20 pounds per gallon of said standard coal tar emulsion, the ratio of water to coal tar emulsion being about 1 to about 1, whereby after mixing, a thixotropic composition is formed that retains sufficient thixotropicity to retard significant settling of the sand homogeneously mixed to form the rubberized coal-tar-containing composition.

18. The composition of claim 17 in which the latex contains from about 50 to about 90 percent by weight butadiene, from about 49 to about 9 percent by weight styrene, and from about 1 to about 5 percent by weight of an olefinic unsaturated carboxylic acid, and mixtures thereof.

19. The composition of claim 17 in which the latex copolymer emulsion ranges from about 2 to about 20 percent by volume of the coal tar emulsion.

20. The composition of claim 17 in which the average particle size of the emulsion is from 600 to 2000 Ångstroms.

21. The composition of claim 17 in which the sand has a particle size range such that all sand passes through a U.S. Standard No. 20 mesh square screen and wherein 50 percent by weight of the sand passes through a U.S. Standard No. 30 mesh square screen, with no more than 2 weight percent passing through a U.S. Standard No. 100 mesh square screen.

22. The composition of claim 17 in which said polymerizable ethylenically unsaturated carboxylic acid is a monocarboxylic acid or mixtures thereof.

23. The composition of claim 22 in which the ethylenically unsaturated monocarboxylic acid is methacrylic acid.

24. The composition of claim 22 in which the ethylenically unsaturated monocarboxylic acid is acrylic acid.

25. The composition of claim 22 in which the ethylenically unsaturated monocarboxylic acid is crotonic acid.

26. The composition of claim 22 in which the ethylenically unsaturated monocarboxylic acid is a mixture of methacrylic acid and acrylic acid.

27. The composition of claim 17 in which the ethylenically unsaturated carboxylic acid is a mixture of monocarboxylic and polycarboxylic ethylenically unsaturated acids.

28. The composition of claim 17 in which said polymerizable ethylenically unsaturated carboxylic acid is a polycarboxylic acid or mixtures thereof.

29. The composition of claim 28 in which the ethylenically unsaturated polycarboxylic acid is fumaric acid.

30. The composition of claim 28 in which the ethylenically unsaturated polycarboxylic acid is itaconic acid.

31. The composition of claim 28 in which the ethylenically unsaturated polycarboxylic acid is a mixture of fumaric acid and itaconic acid.

32. The composition of claim 28 in which the ethylenically unsaturated polycarboxylic acid is a mixture of fumaric acid and methacrylic acid.

33. The aqueous rubberized coal tar emulsion coating composition of claim 1 which contains homogeneously mixed therein an aggregate, said aggregate being present in the amount of between 0.5 and about 20 pounds per gallon of said standard coal tar emulsion.

34. An improved paved asphalt surface and the like, which is prepared by applying a thin coating of a thixotropic composition that consists essentially of a mixture of a standard coal tar emulsion containing about 40 to about 60 percent water based on the volume of the coal tar emulsion, from about 1 to about 12 percent by weight of a latex emulsion copolymer based on the volume of the coal tar emulsion, wherein said copolymer contains at least 50 percent by weight of a combination of butadiene and styrene, and up to about 20 percent by weight of at least one polymerizable ethylenically unsaturated monomer containing at least one carboxylic acid group or mixtures thereof to form the acid copolymer latex, said acid copolymer latex emulsion having an average latex particle size of from about 400 to about 2000 Ångstroms, all moieties of the copolymer based on the weight of the copolymer latex emulsion, and sand being present in the amount of between 0.5 to about 20 pounds per gallon of said conventional coal tar emulsion, the ratio of water to coal tar emulsion being about 1 to about 1, whereby said dried coating presents a hard durable surface on the surface of the paved asphalt.

* * * * *